(12) United States Patent
Karaoguz

(10) Patent No.: US 11,556,137 B2
(45) Date of Patent: Jan. 17, 2023

(54) METHOD OF ASSISTING WITH THE DRIVING OF VEHICLES CARRIED OUT BY ASSOCIATED SYSTEM INCLUDING SENSORS INSTALLED ALONG SECTIONS OF ROAD

(71) Applicant: TRANSDEV GROUP, Issy les Moulineaux (FR)

(72) Inventor: Cem Karaoguz, Guyancourt (FR)

(73) Assignee: TRANSDEV GROUP INNOVATION, Issy-les-Moulineaux (FR)

(*) Notice: Subject to any disclaimer, the term of this patent is extended or adjusted under 35 U.S.C. 154(b) by 319 days.

(21) Appl. No.: 16/850,945

(22) Filed: Apr. 16, 2020

(65) Prior Publication Data
US 2020/0333803 A1 Oct. 22, 2020

(30) Foreign Application Priority Data
Apr. 18, 2019 (FR) .................... 19 04167

(51) Int. Cl.
*G05D 1/02* (2020.01)
*G05D 1/00* (2006.01)

(52) U.S. Cl.
CPC ......... *G05D 1/0297* (2013.01); *G05D 1/0088* (2013.01); *G05D 1/0285* (2013.01); *G05D 2201/0213* (2013.01)

(58) Field of Classification Search
CPC .. G05D 1/0297; G05D 1/0088; G05D 1/0285; G05D 2201/0213
See application file for complete search history.

(56) References Cited

U.S. PATENT DOCUMENTS

| 9,595,193 B1* | 3/2017 | Duale .................. G08G 1/0116 |
| 10,109,185 B1* | 10/2018 | Dubois, Jr. .......... G08G 1/0133 |
| 10,805,778 B2* | 10/2020 | Bruns ..................... H04W 4/70 |
| 2015/0149070 A1 | 5/2015 | DeKock et al. |
| 2016/0057335 A1 | 2/2016 | Pisz |
| 2018/0233042 A1 | 8/2018 | Zhang et al. |

FOREIGN PATENT DOCUMENTS

GB        2551682 A       1/2018

OTHER PUBLICATIONS

French Search Report for Application No. 19 04167, dated Dec. 10, 2019 in 2 pages.

* cited by examiner

*Primary Examiner* — Ramsey Refai
(74) *Attorney, Agent, or Firm* — Knobbe, Martens, Olson & Bear, LLP

(57) ABSTRACT

A method is for assisting with the driving of vehicles traveling on a road by an assistance system including a sensor installed along sections of the road and an electronic processor. The method includes reception by the processor of a request indicating a road portion and requesting information on the state of the portion, determination by the processor, as a function of the requested information and the road portion, of the configuration among several determined configurations, of the sensor, sending by the processor to the sensor of a command indicating the configuration, sending the processor data delivered by the sensor in the configuration, and sending by the processor of the information determined as a function of the data.

8 Claims, 2 Drawing Sheets

METHOD OF ASSISTING WITH THE DRIVING OF VEHICLES CARRIED OUT BY ASSOCIATED SYSTEM INCLUDING SENSORS INSTALLED ALONG SECTIONS OF ROAD

CROSS-REFERENCE TO RELATED APPLICATION

This application claims priority to French Patent Application No. 19 04167 filed on Apr. 18, 2019, the disclosure of which including the specification, the drawings, and the claims is hereby incorporated by reference in its entirety.

TECHNICAL FIELD OF THE INVENTION

The present invention relates to the field of systems for assisting with the driving of vehicles, for example autonomous or at least partially assisted vehicles, based on sensors positioned along traffic lanes of the vehicles.

BACKGROUND OF THE INVENTION

In such a system, there is a need to obtain relevant information regarding the driving of the vehicles while limiting the bandwidth necessary to obtain this information.

SUMMARY OF THE INVENTION

To that end, according to a first aspect, the invention proposes a method for assisting with the driving of vehicles, said method being characterized in that it comprises the following steps carried out by an electronic system for assisting with the driving of vehicles traveling on a road including a set of sensor(s) installed along sections of the road and an electronic processor:
  reception by the processor of a request, coming from an electronic device, indicating a road portion and requesting information relative to the state of said road portion;
  determination by the processor, as a function of said requested information and said road portion, of the configuration among several determined configurations, of at least one sensor of the set of sensor(s);
  sending by the processor to said sensor of a command indicating said configuration;
  upon reception of said command, implementation, by said sensor, of said commanded sensor configuration and sending, by the sensor to the processor, of data delivered by said sensor in said configuration;
  reception of said data by the processor, determination of the requested information in response to the request as a function of said data and sending by the processor of said information to the electronic device.

The invention thus makes it possible to provide, in real time, specific information corresponding to the periodic need of a vehicle based on a set of sensor(s) whose configuration is adapted as a function of the current need. The need is thus met while limiting the sent volume of data.

In embodiments, the method for assisting with the driving of vehicles according to the invention further includes one or more of the following features:
  It comprises the following steps implemented by said electronic device, in the context of determining a driving instruction of a vehicle:
    identification of a lack of information relative to the state of said road portion;
    following said identification, generation of said request indicating said road portion and said requested information relative to the state of said road portion, and sending of said request to the processor;
    reception of said information subsequently sent by the processor in response to said request and determination of a driving instruction of a vehicle as a function of said information;
  the electronic device is embedded in one of said vehicles or remotely controls a fleet of vehicles, including said vehicle;
  the electronic device remotely controls a fleet of vehicles and orchestrates the relative movements of said vehicles with respect to one another as a function of said information;
  following the reception of the request and before sending the command, the processor sends an electronic supervision device an authorization request indicating the elements of the request and only sends the command to the sensor after having received an authorization from said electronic supervision device in response to its authorization request;
  the configuration of a sensor of the set of sensors is determined by the implementation of an automatic optimization function seeking to:
    maximize the overlap of the field of view of the sensor with the road portion and/or
    minimize the overlap between the fields of view of the sensors.

According to a second aspect, the present invention proposes a system for assisting with the driving of vehicles traveling on a road, said system including a set of sensor(s) installed along sections of the road and an electronic processor adapted to receive a request, coming from an electronic device, indicating a road portion and requesting information relative to the state of said road portion, in order to determine, as a function of said requested information and said road portion, the configuration among several determined configurations, of at least one sensor of the set of sensor(s), to send, to said sensor, a command indicating said configuration; said sensor being adapted, upon reception of said command, to implement said commanded sensor configuration, to detect data in said configuration and to send said data to the processor;
the processor being adapted to receive said data, to determine requested information in response to the request as a function of said data and to send said information to the electronic device.

According to a third aspect, the present invention proposes a computer program comprising software instructions which, when executed by a computer, carry out the steps of a method according to the first aspect of the invention for which the processor is responsible.

BRIEF DESCRIPTION OF THE DRAWINGS

These features and advantages of the invention will appear upon reading the following description, provided solely as an example, and done in reference to the appended drawings, in which.

DETAILED DESCRIPTION

Figure 1:
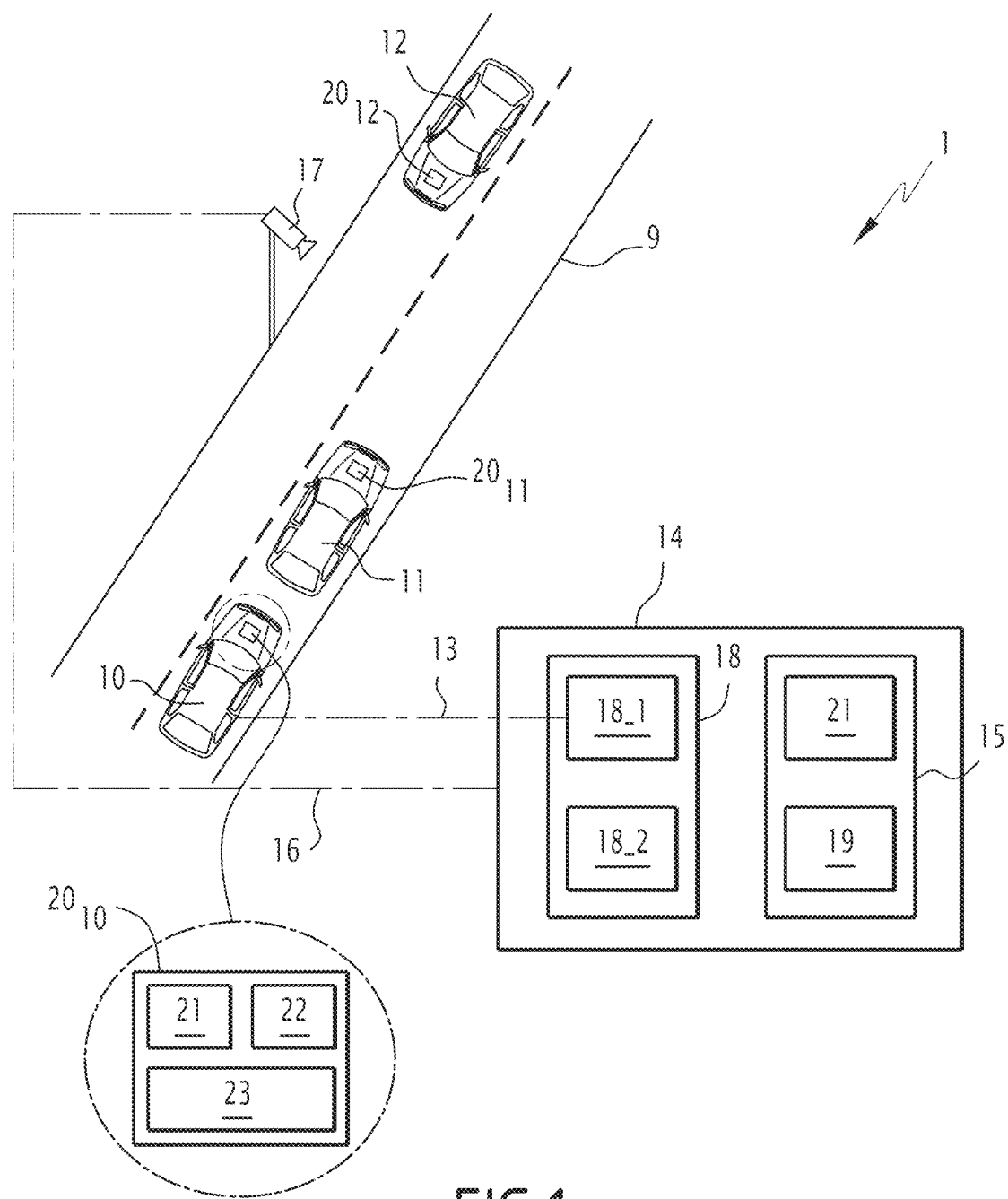
FIG. 1 shows a view of a system for assistance with the driving of autonomous vehicles in one embodiment of the invention.

FIG. 1 shows a system 1 for assistance with the driving of autonomous vehicles, for example including the vehicles 10, 11, 12.

The assistance system 1 includes a processor 14 and a set of sensor(s) 17.

In the considered case, the set of sensor(s) 17 includes a sensor, installed along a road 9.

The sensor is for example a video camera 17 adapted to capture image data of the road portion 9 located in the acquisition zone of the video camera.

The video camera 17 is for example provided with motor(s) making it possible to modify its tilt and pan angles, which modifies its acquisition zone accordingly.

The video camera 17 further includes a wired telecommunications submodule suitable for establishing telecommunications for example according to the Ethernet protocol over a wired connection linking it to the processor 14.

The processor 14 includes a control unit 15 and a telecommunications unit 18.

The control unit 15 includes a memory 21 and a microprocessor 19. In the considered embodiment, the memory 21 stores software instructions which, when executed on the microprocessor 19, implement the steps for which the control unit 15 is responsible that are described below in reference to FIG. 2.

The telecommunications unit 18 for example includes a wireless telecommunications subunit 18_1 and a wired telecommunications subunit 18_2.

The wireless telecommunications subunit 18_1 is for example suitable for establishing wireless telecommunications, for example according to the Wi-Fi, or 4G protocol; it for example includes a radiofrequency transmitter and receiver, as well as a radiofrequency antenna.

The wired telecommunications subunit 18_2 is suitable for establishing telecommunications over a wired connection 16 linking it to the sensor 17. In another embodiment, the telecommunications subunit 18_2 is also suitable for establishing wireless telecommunications instead.

The protocol implemented on the connection 16 is for example of the FireWire, Camera Link, GigE, Serial, CoaXPress, Ethernet, LDVS, CAN, Wi-Fi, radiofrequency, etc. type.

The vehicles 10, 11, 12 are for example each equipped with an embedded automatic pilot device, respectively $20_{10}$, $20_{11}$, $20_{12}$.

The automatic pilot device $20_{10}$ embedded in the vehicle 10, similar to the embedded automatic pilot devices $20_{11}$, $20_{12}$, as shown in zoom in FIG. 1, includes a geolocation module 21, for example of the GPS type, suitable for determining the location of the vehicle, a wireless telecommunications module 22 suitable for establishing telecommunications with the wireless telecommunications subunit 18_1 of the processor 14, an electronic autonomous driving module 23 and one or several embedded sensors, for example of the camera type (not shown).

In the considered embodiment, the driving module 23 is suitable for determining driving instructions controlling the engine of the vehicle 10 and the direction of the vehicle 10, in particular as a function of the current position of the vehicle 10 determined by the geolocation module 21, data detected by the embedded sensors and a predetermined destination of the vehicle 10.

In the considered embodiment, the driving module 23 includes a memory and a microprocessor (not shown), the memory storing software instructions which, when executed on the microprocessor, implement the steps for which the driving module 23 is responsible that are described below in reference to FIG. 2.

Figure 2:
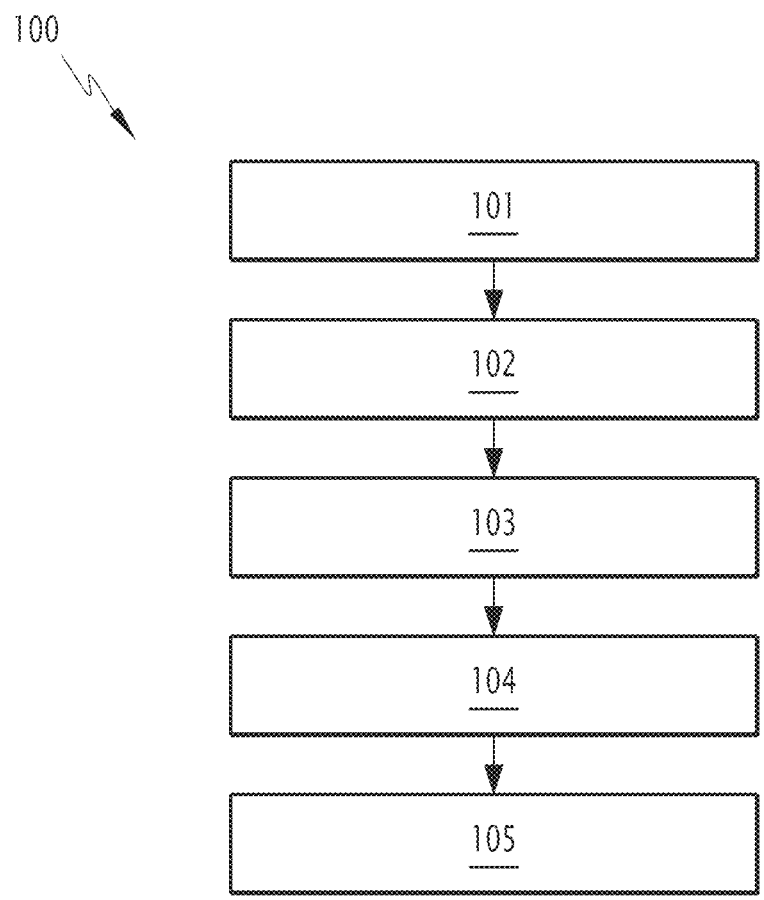
FIG. 2 is a flowchart of steps implemented in one embodiment of the invention.

FIG. 2 indicates the steps of a set 100 of operations implemented in one embodiment of the invention.

In a step 101, the driving module 23 of the vehicle 10 determines, during an operation for computing a next driving instruction, that additional information regarding the current situation is necessary to determine such an instruction, which cannot be provided by the embedded sensors.

For example, the driving module 23 has identified that an obstacle, here the stopped vehicle 11, is obstructing its traffic lane on the road 9, preventing it from continuing on this path, and determines that to bypass the obstacle, the driving module 23 must receive information on the current state of occupancy of the lane in the opposite direction on the road 9, that the data provided by the embedded sensors by the vehicle 10 and at least partially blinded by the proximity of the vehicle 11, does not make it possible to characterize sufficiently.

The driving module 23 then generates a request that indicates that information is needed regarding the status of a certain area of interest (here regarding safe travel), the traffic lane 9 regarding the direction of travel opposite the vehicle 10 (the left lane in FIG. 1, that where the car 12 is traveling), from its corresponding position as indicated by the geolocation module 21 and in a segment of determined length (for example, 200 meters) in the sense of the direction of the vehicle 10 (this zone thus defined corresponds, in this case, to said area of interest).

Then this request thus generated is sent, via the wireless telecommunications module 22, to the processor 14.

In a step 102, the wireless telecommunications subunit 18_1 of the processor 14 receives this request and delivers it to the control unit 15 of the processor 14. The control unit 15 of the processor 14 then determines, as a function of the position of the camera 17, the set of tilt and pan values achievable by the camera 17 and the indicated area of interest, whether the latter is suitable for providing data representative of the area of interest indicated in the request, and further determines tilt and pan angle values of the camera 17 making it possible to obtain these data. Then the control unit 15 sends, via the wired telecommunications subunit 18_2, a command to adjust the camera indicating these tilt and pan angle values.

In a step 103, the camera 17 receives this command, extracts the indicated values therefrom, and modifies its configuration in real time according to the indicated values, by actuating the motor. After modifying the configuration of the camera, it sends a confirmation message to the processor 14 confirming the proper implementation of the change (or invalidating it, if necessary).

Then the camera 17 captures the corresponding image data and sends them in real-time, via its wired telecommunications submodule, to the processor 14.

In a step 104, the processor 14 receives, via its wired telecommunications subunit 18_2, said data acquired by the camera 17. In embodiments, the control unit 15 performs a processing operation of the data (extraction of only the useful data in light of the request, identification and/or classification, and/or tracking and/or location of objects such as vehicles, pedestrians, bicycles, etc. traveling in the area of interest, for example, the presence of the vehicle 12 is detected). It will be noted that these processing operations in another embodiment are done in whole or in part, upstream by the sensor 17.

Then, the control unit 15 determines, as a function of these data, if applicable processed, the information, hereinafter called additional information, to be provided in response to the request received in step 102, and sends them, via its wireless telecommunications subunit 18_1, over a wireless link 13 to the automatic pilot device 20$_{10}$.

In a step 105, the automatic pilot device 20$_{10}$ receives this additional information and determines a driving instruction of the vehicle further as a function of this additional information. For example, it determines that the location, as indicated in the received additional information, of the vehicle 12 traveling over the area of interest is too close to allow immediate passing of the vehicle 11 and determines a necessary stopping time as a function of the received information, at the end of which it will trigger passing of the vehicle 11.

It will be noted that according to the invention, aside from the orientation of the camera 17, other configuration parameters of the camera 17 can be determined by the control unit 15, for example the zoom factor of the camera, filters, etc.

It will be noted that according to the invention, aside from the orientation of the camera 17, other configuration parameters of the camera 17 can be required by the driving module 23.

The change of configuration can be implemented by the sensor using hardware or software.

In one example where a multi-resolution camera 17 is used, the modifiable configuration parameters according to the invention can define a portion of the image acquired with a higher resolution than the rest of the image, as well as the resolution levels.

Similarly for any type of sensor, the processing can be applied only in a restricted area of interest defined within the acquisition area: for example, a perception system with several LIDAR sensors must process many points coming from each sensor, therefore the processing is done in low resolution overall (that is to say, not all of the points are used, sampling is done) and the processing is done in high resolution only in the limited area of interest.

Thus, the necessary computing resources are reduced.

The spectrum of the camera is, depending on the case, in the visible domain and/or the infrared domain.

In other embodiments, the set of sensor(s) 17 includes another type of sensor in place of the camera or several sensors, optionally including a camera. Such sensors are, depending on the case, for example suitable for detecting, classifying, tracking certain types of objects (vehicles, bicycles, pedestrians, rain, obstacles, animals, etc.) and/or object characteristics (location, speed, distance to a given point, size, class, etc.). Additionally, according to the invention the processor 14 determines the configuration parameters of the sensors as a function of the received request.

For example, a sensor is of the LIDAR, LEDDAR, RADAR type.

Depending on the embodiments, sensors are suitable for performing preprocessing, before the acquisition, object detection, object size estimation, object classification, object location, speed and/or object acceleration estimation, object tracking, engine control, aside from implementing wireless telecommunications intended for the processor 14. It will be noted that at least some of these functions could alternatively be performed in the processor 14.

In one embodiment, the sensors are positioned so as in particular to monitor at-risk areas, such as traffic intersections, roundabouts, pedestrian crosswalks, etc.

In the example of step 101 above, the request for additional information from the processor 14 by the driving module 23 has been triggered following an identified passing need.

Such a request can be triggered in other situations, for example and non-limitingly, by the driving module 23, in particular:
- upon approaching an intersection or a roundabout->to focus the processing around the path of the vehicle,
- in the event that important regions of the pedestrian crosswalk type are hidden: if the embedded system detects that a certain portion of an important region is hidden, it may ask for additional information;
- upon approaching a bus or tram station, to determine whether there are potential passengers for boarding.

In one embodiment, requests similar to that described in step 101 are developed and sent by an electronic module (not shown) for supervising the fleet of vehicles, responsible for remotely monitoring the travel of the vehicles 10-12, controlling them at all times (in this case, there may not be any communication between the embedded control device and the processor 14) or periodically, for example only when the electronic supervision module detects a sensitive situation and then takes control over the driving of one vehicle or several vehicles.

In another embodiment, in step 101, the request for additional information is sent by the driving module 23 to the processor 14, and before the processor 14 sends a command to set configuration parameters to the sensor, the processor 14 requires an approval request from an electronic supervision module, accompanying this approval request by the request for additional information and/or configuration parameters of determined sensor(s). Additionally, the processor 14 does not send the configuration setting command to the sensor(s) unless approval has been provided in response by the supervision module.

The supervision module then includes the equivalent of the driving modules 23 of the vehicles and is likewise for example made in the form of a memory storing software instructions and a microprocessor.

The supervision module includes a telecommunications unit suitable for implementing wireless communications with the vehicles to communicate the driving instructions to them, optionally to receive data from them such as their position, their destination, the data acquired by the embedded sensors, and to implement wireless or wired communications with the processor 14 in order to send the requests and receive the additional information in return.

Thus, the supervision module can orchestrate the movements of the various vehicles relative to one another, as a function of the additional information provided by the processor, when the movement of one of the vehicles affects the movement of another of said vehicles. For example, in the situation shown in FIG. 1, the supervision module can stop the vehicle 12, then cause the vehicle 10 to pass the vehicle 11, or command any other sequence of actions by the vehicles, as a function of the data communicated by the vehicles, received additional information, and various parameters such as a relative priority index assigned to each vehicle, making it possible to prioritize their respective movement with respect to one another.

The movements are thus globally optimized and driving safety is increased.

In one embodiment, such a supervision module exchanges with several processors similar to the processor 14 and distributed in different locations.

The present invention thus proposes an active perception system, making it possible to enrich the perception of the environment of the vehicles by providing relevant information in real time, responding to the current needs for information as they have been expressly indicated and which are necessary in order for relevant driving decisions to be made.

The area of interest can be represented, depending on the embodiments, by a single point, a collection of points, a polygon or polyhedron in a predefined coordinate system, which is known by the requesting device and the processor.

In one embodiment, in step 102, the control unit 15 makes the changes of coordinate system in order to translate the area of interest into the coordinate system specific to each sensor, for example by computing: $R^S = H_A^S R^A$, where $R^S$ are the coordinates of the area of interest expressed in the coordinate system of a sensor, $R^A$ are the coordinates of the area of interest expressed in the predefined coordinate system used for the exchanges between the driving module (or the supervision module) and the processor 14 and $H_A^S$ is the conversion matrix between the two coordinate systems. If the predefined coordinate system is a dynamic coordinate system, for example the coordinate system of the vehicle, the conversion is computed automatically by the control unit 15 as a function of the data in the request (in particular location and orientation of the vehicle).

It will be noted that in step 104, aside from the additional information for example indicating detected objects, the processor 14 further provides the automatic pilot device $20_{10}$ for example with the coordinates of each object (and if applicable with the elements necessary to translate them into the coordinate system used by the driving device or then it performs the coordinate system change conversion before sending).

In one embodiment, step 102 includes an optimization operation to determine the sensor configuration that maximizes the overlap between the area of interest and the field of view of the sensor, or the configuration c of the sensor s that maximizes $f(R^s, F_c^s)$:

where $F_c^s$ is the field of view of the sensor s for its configuration c and $f$, such that $0 < f < 1$, is a similarity function that evaluates a similarity between its two input variables, here $R^s$ and $F_c^s$.

As area of interest, the field of view can be represented by a point or collection of points defined in a 2D, respectively 3D space forming a polygon, respectively a polyhedron.

$d^s$ is the score of the optimization process:

$$d^s = \max_c f(R^s, F_c^s).$$

In one embodiment, the area of interest can cover a broad zone covered by more than one sensor of the set of sensor(s). In this case, the following multivariable optimization is done to determine the configuration of each sensor:

$$d^E = \max_{c_1, \ldots, c_N} \left( \sum_{i=1}^{N} f(R^{s_i}, F_{c_i}^{s_i}) + \sum_{j=1}^{N} \sum_{i=j+1}^{N} \left(1 - f(F_{c_i}^{s_i}, F_{c_j}^{s_j})\right) \right)$$

where $E = \{s_1, s_2, \ldots S_N\}$ the set of sensors, $c_i$: configuration for the sensor N: total number of sensors.

The first term in parentheses makes it possible to maximize the overlap of the field of view of each sensor with the area of interest, while the second term minimizes the overlap between the individual fields of view of the sensors. This makes it possible to prevent individual sensors from monitoring the same area and to maximize coverage of the area of interest.

The configuration of a sensor can correspond to a hardware state, for example tilt, pan and/or zoom, and/or to a software state commanded by at least one parameter, for example the sampling of a portion at a high resolution level.

The similarity function $f(x,y)$ can correspond to a basic intersection computing operation (that is to say, the ratio of the overlap area to the area of interest or the field of view). Thus, the function interprets the area of interest and the field of view as being more similar as their overlap increases. Alternatively, the function implements the computation of the Jaccard index between its input variables (Jaccard, P. (1912), "The distribution of the flora in the alpine zone". 1. *New phytologist,* 11(2), 37-50). In the latter case, the disproportion caused by the size differences between the inputs x,y can be compensated. Other methods for computing the ratio of the intersection can be used for the function $f(x,y)$.

Once the optimization is done in step 102 (for example setting a respective orientation for each sensor, example {sensor $s_1$ oriented at 90 degrees, sensor $s_2$ oriented at 85 degrees}, a decision function g( ) can be used to determine the sensors of interest.

For example, the decision function g can be a similarity score function of the sensor $g(z_{c*}^{s_i})$ where $g(z_{c*}^{s_i}) = f(R^{s_i}, F_{c*}^{s_i})$, $c^*$ being the optimal configuration. The function implements a thresholding operation where only the sensors whose score exceeds a certain threshold are selected by the processor 14 to collect the data on the area of interest to meet the request. Other decision functions can be used. And in step 103, commands are sent by the processor 14 to each sensor thus selected commanding them to acquire data with their optimal configuration determined according to the optimization process.

In one embodiment, in step 101, the driving module 23 (or the supervision module) indicates a type of required additional information: for example one or more specific classes of objects in a certain area of interest (or objects not belonging to a specified class) and/or objects moving in a specified direction (for example to the east) in a certain area of interest and/or objects with a speed value comprised in a specified range, etc. Such requests can lead to commands in step 102 to adapt their configuration in terms of detection or classification model, optionally without changing field of view (that is to say, in particular without engine use).

In one embodiment, the driving module 23 and/or the supervision module and/or the control unit 15 is made in the form of a programmable logic component, such as an FPGA (Field Programmable Gate Array), or in the form of a dedicated integrated circuit, such as an ASIC (Application Specific Integrated Circuit).

What is claimed is:

1. A method for assisting with the driving of vehicles, said method comprising the following steps carried out by an electronic system for assisting with the driving of vehicles traveling on a road including a set of sensor(s) installed along sections of the road and an electronic processor:

reception by the processor of a request, coming from an electronic device, indicating a road portion and requesting information relative to the state of said road portion;

determination by the processor, as a function of said requested information and said road portion, of the configuration among several determined configurations, of at least one sensor of the set of sensor(s);

sending by the processor to said sensor of a command indicating said configuration;

upon reception of said command, implementation, by said sensor, of said commanded sensor configuration and sending, by the sensor to the processor, of data delivered by said sensor in said configuration;

reception of said data by the processor, determination of the requested information in response to the request as a function of said data and sending by the processor of said information to the electronic device, wherein the configuration of a sensor of the set of sensors is determined by the implementation of an automatic optimization function seeking to:

maximize the overlap of the field of view of the sensor with the road portion and/or minimize the overlap between the fields of view of the sensors.

2. A method for assisting with the driving of vehicles according to claim 1, comprising the following steps implemented by said electronic device, in the context of determining a driving instruction of a vehicle:

identification of a lack of information relative to the state of said road portion;

following said identification, generation of said request indicating said road portion and said requested information relative to the state of said road portion, and sending of said request to the processor;

reception of said information subsequently sent by the processor in response to said request and determination of a driving instruction of a vehicle as a function of said information.

3. The method for assisting with the driving of vehicles according to claim 1, wherein the electronic device is embedded in one of said vehicles or remotely controls a fleet of vehicles, including said vehicle.

4. The method for assisting with the driving of vehicles according to claim 3, wherein the electronic device remotely controls a fleet of vehicles and orchestrates the relative movements of said vehicles with respect to one another as a function of said information.

5. A method for assisting with the driving of vehicles, said method comprising the following steps carried out by an electronic system for assisting with the driving of vehicles traveling on a road including a set of sensor(s) installed along sections of the road and an electronic processor:

reception by the processor of a request, coming from an electronic device, indicating a road portion and requesting information relative to the state of said road portion;

determination by the processor, as a function of said requested information and said road portion, of the configuration among several determined configurations, of at least one sensor of the set of sensor(s);

sending by the processor to said sensor of a command indicating said configuration;

upon reception of said command, implementation, by said sensor, of said commanded sensor configuration and sending, by the sensor to the processor, of data delivered by said sensor in said configuration;

reception of said data by the processor, determination of the requested information in response to the request as a function of said data and sending by the processor of said information to the electronic device, wherein following the reception of the request and before sending the command, the processor sends an electronic supervision device an authorization request indicating the elements of the request and only sends the command to the sensor after having received an authorization from said electronic supervision device in response to its authorization request.

6. A system for assisting with the driving of vehicles traveling on a road, said system including a set of sensor(s) installed along sections of the road and an electronic processor adapted to receive a request, coming from an electronic device, indicating a road portion and requesting information relative to the state of said road portion, in order to determine, as a function of said requested information and said road portion, the configuration among several determined configurations, of at least one sensor of the set of sensor(s), to send, to said sensor, a command indicating said configuration;

said sensor being adapted, upon reception of said command, to implement said commanded sensor configuration, to detect data in said configuration and to send said data to the processor;

the processor being adapted to receive said data, to determine requested information in response to the request as a function of said data and to send said information to the electronic device, wherein the configuration of a sensor of the set of sensors is determined by the implementation of an automatic optimization function seeking to:

maximize the overlap of the field of view of the sensor with the road portion and/or minimize the overlap between the fields of view of the sensors.

7. A system for assisting with the driving of vehicles according to claim 6, including said electronic device, which is suitable, in the context of determining a driving instruction of a vehicle, for identifying a lack of information relative to the state of said road portion, for, after said identification, generating said request indicating said road portion and said requested information relative to the state of said road portion and for sending said request to the processor and for receiving said information later sent by the processor in response to said request and determining a driving instruction of a vehicle as a function of said information.

8. The system for assisting with the driving of vehicles according to claim 7, wherein the electronic device is embedded in one of said vehicles or remotely controls a fleet of vehicles, including said vehicle.

* * * * *